Jan. 28, 1958  V. J. HULTQUIST  2,821,218
BORING AND MORTISING TOOL ATTACHMENT
Filed June 15, 1955  3 Sheets-Sheet 1
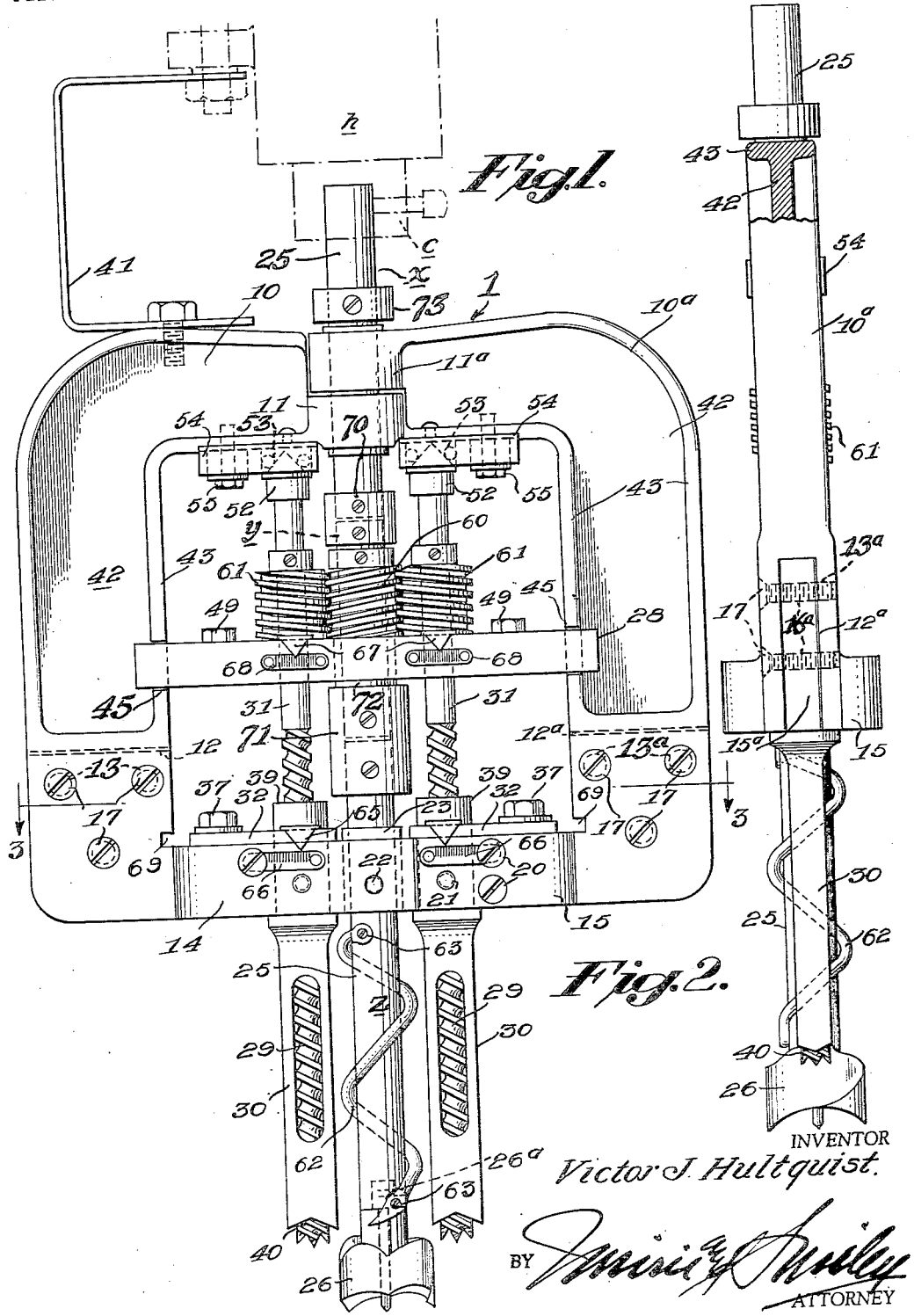
INVENTOR
Victor J. Hultquist.
BY
ATTORNEY

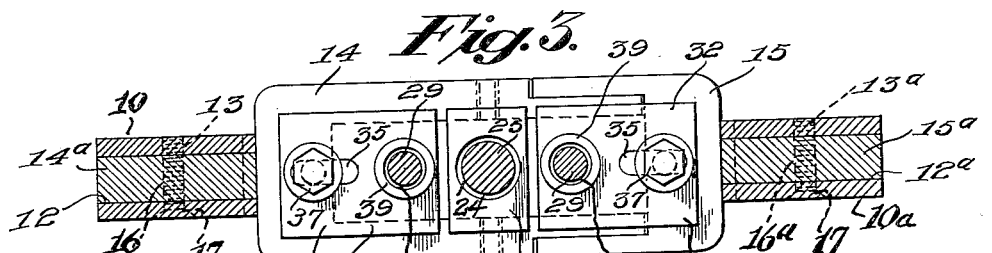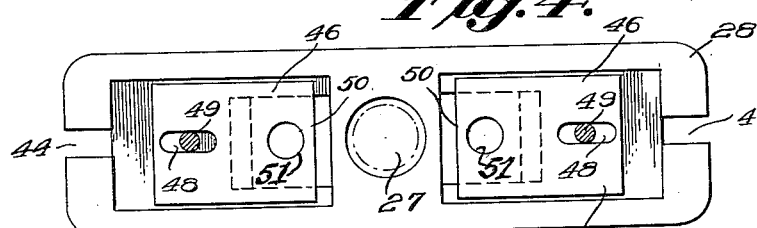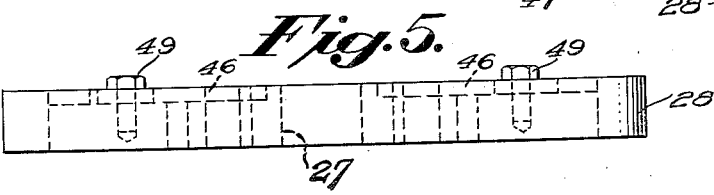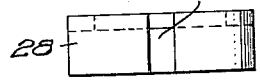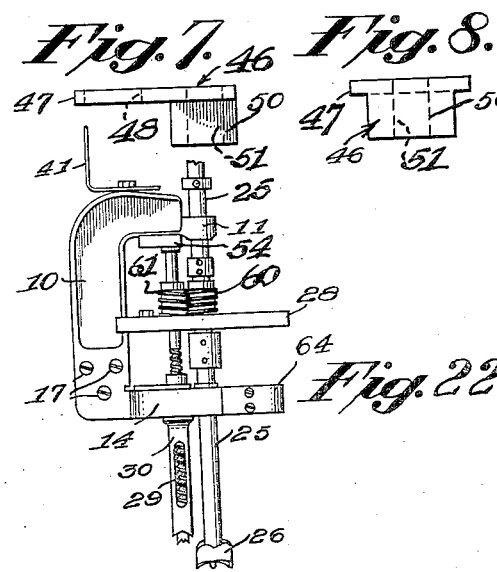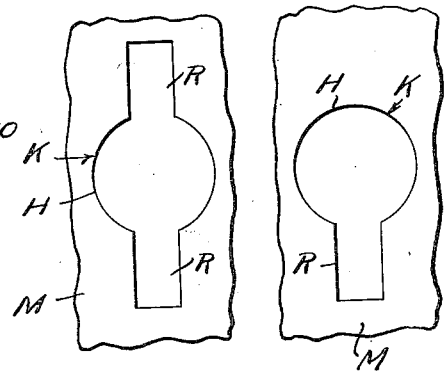

Jan. 28, 1958   V. J. HULTQUIST   2,821,218
BORING AND MORTISING TOOL ATTACHMENT
Filed June 15, 1955   3 Sheets-Sheet 3
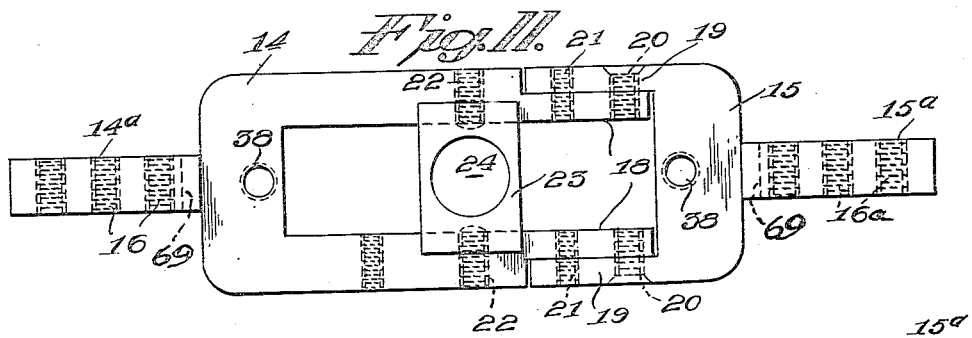
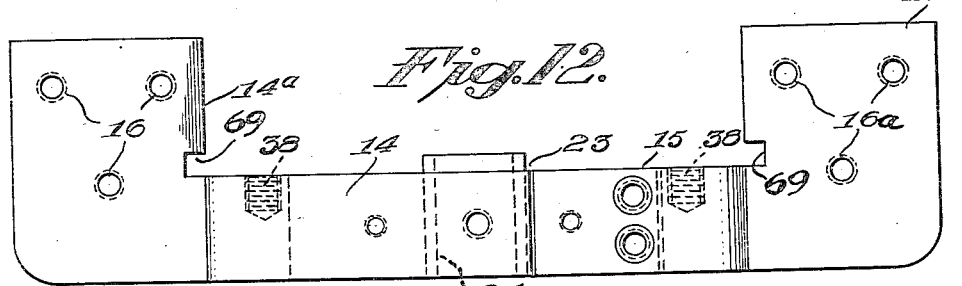
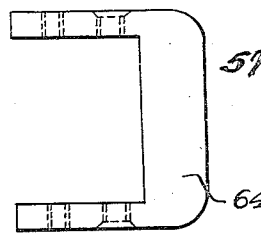
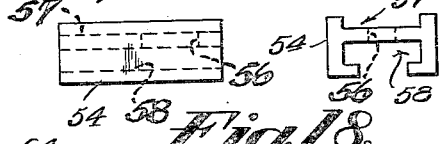
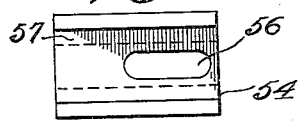
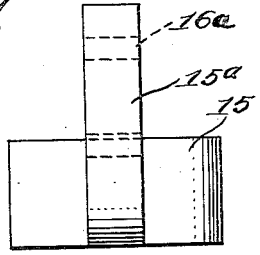
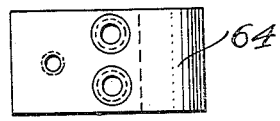
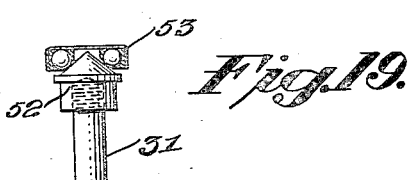
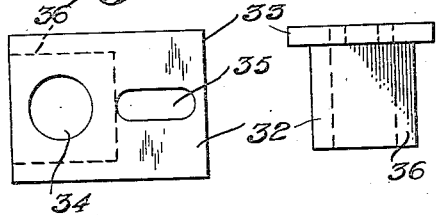
INVENTOR
*Victor J. Hultquist*
BY
ATTORNEY

United States Patent Office 2,821,218
Patented Jan. 28, 1958

2,821,218

BORING AND MORTISING TOOL ATTACHMENT

Victor J. Hultquist, Alcoa, Tenn.

Application June 15, 1955, Serial No. 515,591

10 Claims. (Cl. 144—78)

This invention relates to boring and mortising tools, and more particularly to a boring and mortising tool formed as a boring and drill attachment.

The invention is more particularly concerned with a boring and mortising tool in the form of an attachment adapted for operative connection with a drill press head and chuck, and which is particularly characterized by means for forming keyholes or the like in boards and studs of varying thicknesses.

Keyholes as presently formed embody a circular hole and in some instances further comprise diametrically opposed rectangular slots which open into the hole. In other instances, keyholes embody the circular hole and a single diametrically disposed rectangular slot which opens into the hole.

It is a primary object of this invention to provide a tool which is capable of forming a keyhole of either of the above noted forms in a single operation.

A further object of the invention is to provide a keyhole forming tool removably attachable to a drill press and which is of sectional formation whereby certain cutting and boring parts may be readily removed and replaced upon occasion for key holes having a single slot or a pair of slots.

A still further object of the invention is to provide a tool of the above noted general character and for the purpose set forth which comprises boring and cutting elements together with adjustable bearings therefor whereby various size boring and cutting elements may be incorporated in the tool for forming various size keyholes.

A still further object of the invention is to provide a keyhole forming tool which is of sectional formation for the ready replacement of worn or broken parts.

A still further object of the invention is to provide a tool of the kind referred to which embodies a central relatively large diameter bit and wherein a spiral member is removably secured to a shank of said bit in surrounding relation thereto for continuous removal of chips from a hole being formed by the bit.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts through the several figures and in which:

Fig. 1 is a front view in elevation of a mortising tool according to the present invention, the tool being shown in operative connection with a drill press which is fragmentally indicated by broken lines;

Fig. 2 is a side view in elevation of the tool per se;

Fig. 3 is a horizontal sectional view corresponding to the plane of line 3—3 of Fig. 1;

Fig. 4 is a top plan view of a spacer bar having drill bit thrust bearing blocks operatively associated therewith;

Fig. 5 is a side view in elevation of the bar and bearing blocks shown in Fig. 4;

Fig. 6 is an end view in elevation of the spacer bar;

Fig. 7 is a side view in elevation of one of the bearing blocks adjustably supported by the spacer bar;

Fig. 8 is an end view in elevation of one of the bearing blocks;

Fig. 9 is a plan view of a fragmental portion of material having a keyhole provided by the improved tool in the use of two chisels and respective cooperating bits;

Fig. 10 is a view similar to Fig. 9 wherein is shown a keyhole as provided by the tool in the use of a single chisel and cooperating bit;

Fig. 11 is a top plan view of a pair of cooperating lower yoke members embodied in a frame of the tool;

Fig. 12 is a side view in elevation of the lower yoke members shown in Fig. 11;

Fig. 13 is an end view in elevation of one of the lower yoke members;

Fig. 14 is a top plan view of an auxiliary lower yoke member adapted for use in the formation of the keyhole slot shown in Fig. 10;

Fig. 15 is a side view in elevation of the auxiliary lower yoke member shown in Fig. 14;

Fig. 16 is a side view in elevation of one of two members adjustably supported by the tool frame and having a thrust bearing for the upper end of one of the bits;

Fig. 17 is an end view in elevation of the member shown in Fig. 16;

Fig. 18 is a top plan view of the member shown in Figs. 16 and 17;

Fig. 19 is a view in elevation of the upper end of one of the bits together with a thrust bearing therefor shown in vertical section;

Fig. 20 is a top plan view of a bearing block adjustably supported by one of the lower yoke members;

Fig. 21 is an end view in elevation of the bearing block shown in Fig. 20, and

Fig. 22 (Sheet 2) is a side view in elevation similar to Fig. 1 wherein parts have been removed for forming the keyhole with a single slot as shown in Fig. 10.

Referring now to the drawings, specifically to Fig. 1, a boring and mortising tool drill attachment, according to the present invention, briefly, comprises a shaft 25, the lower end of which carries a drill bit 26 and the upper end of which is adapted to be secured in the chuck c of the head h of a drill press. A frame 1 is mounted on the shaft 25 and is adapted to be secured to the drill press head h by a bracket 41 which serves to retain the frame against rotation with the shaft 25. The frame 1 comprises a pair of upper yoke members 10, 10a, respectively, having at their upper ends bushings 11, 11a which are journalled on the shaft 25. The lower ends of the yoke members 10, 10a are releasably and rigidly connected by lower yoke members 14, 15.

The yoke members 14, 15, in turn, are rigidly connected together and carry a centrally disposed guide bearing 23 for the shaft 25. A spacer bar 28 is mounted between the upper yoke members 10, 10a and this spacer bar 28 and lower yoke members 14, 15 adjustably support journals for a pair of bits 29 disposed on opposite sides of the shaft 25. The bit journals carried by the lower yoke members comprise rectangular mortising chisels 30 which surround the bits 29 and terminate just above and adjacent the circumference of the bit 26 on the lower end of the shaft 25. The bits 29 are driven by helical gears 61 meshing with a helical gear 60 fixed on the shaft 25.

It will be evident from the foregoing description that the shaft 25 is supported and driven by the drill press chuck c and the frame 1 is supported by the bracket 41 in fixed relation to the drill press head h, the shaft 25 driving its bit 26 and also driving the auxiliary bits 29 by the meshing helical gears 60 and 61. As the bits are driven, the drill press head is lowered in the usual manner to engage the bits with the work or, referring to Fig. 9, with the material M. The bit 26 bores the main or circular hole H of keyhole K while the auxiliary bits 29 bore holes substantially tangent to and smaller than the hole H, and the material surrounding the smaller holes is cut away by the chisels 30 to form rectangular slots R opening radially into the main hole H.

Referring to Fig. 1 and in detail to the tool structure, the pair of upper yoke members 10 and 10a are each generally L-shape in side elevation and are disposed in inverted relation with the bushings 11, 11a respectively, in the form of axially aligned bearing hubs at the upper inner ends of the yoke members. The lower ends of the yoke members are bifurcated to provide vertical slots 12 and 12a, also shown in Figs. 2 and 3, and the bifurcations are provided with aligned tapped apertures 13 and 13a transverse of and opening into the slots.

As is shown more clearly in Figs. 11 and 12 the combined lower yoke members 14 and 15 provide an open bearing block supporting frame and are respectively provided with upwardly projecting plate-like end members 14a and 15a which are receivable within the slots 12, 12a in the bifurcated lower ends of the upper yoke members 10 and 10a. The end members 14a and 15a are provided with tapped apertures 16 and 16a aligned with the apertures 13 and 13a, and screws 17 are threaded in the aligned apertures 13, 16 and 13a, 16a to secure the lower yoke members 14 and 15 to the upper yoke members 10 and 10a.

The lower yoke members 14 and 15 are of U-shape and their arms 18 and 19, respectively, are removably secured together in overlapping relation by screws 20 and 21, as best shown in Figs. 11 and 12. The bearing block 23 is rigidly, but adjustably supported by the main lower yoke member 14 and secured as by means of set screws 22. The bearing block 23 has a bearing aperture 24, in which the lower portion of the shaft 25 is rotatably journalled. The shaft 25 extends vertically centrally of the frame defined by the upper and lower yoke members and the central portion of the shaft 25 is rotatably journalled in an opening 27 in the spacer bar 28, as shown in Figs. 1, 3 and 4, so that the shaft 25 is rotatably journalled in the frame 1 at three places, namely the hubs 11, 11a, the bar 28 and the bearing block 23.

While the improved tool provides for the formation of various size keyhole slots wherein the holes H and rectangular portions R will vary, as shown in Figs. 9 and 10, the shaft 25 will remain in axially fixed position regardless of the sizes of keyhole slots to be formed. The bit 26 has a shank 26a which is removably mounted in a socket in the lower end of the shaft 25 whereby the bit 26 may be changed or replaced either to vary the size of the hole H or for the sharpening of the bit or its replacement by a sharper bit. Since the tool is designed to provide various size keyhole slots, both as relates to the circular portions H and the rectangular portions R, wherein various size bits 26 and 29 will be used, the shanks 31 of bits 29 as well as the upper ends of chisels 30 are supported for adjustment of their axes laterally of the axis of the main bit shaft 25.

The shanks 31 of the bits 29 are journalled in a pair of bearing blocks 32 which are mounted for lateral adjustable support on the lower yoke members 14 and 15. Each of these bearing blocks 32, as indicated in Figs. 3, 20 and 21, comprises a top plate 33 with a block 36 dependent from a portion thereof and having an aperture 34 adjacent one end thereof and extending through the block and top plate with an elongated slot 35 in the plate 33 adjacent the opposite end thereof. The plates 33 are slidably supported on the upper faces of yoke members 14 and 15 with the blocks 36 depending between the arms of the yoke members and screws 37 extend through the slots 35 and are threaded into tapped apertures 38 in the lower yoke members 14 and 15, whereby the blocks 32 are capable of being adjusted toward and away from the axis of the main shaft 25 and secured by the screws 37. As shown in Figs. 1 and 3, the upper ends of the chisels 30 comprise tubular portions 39 which are rigidly disposed within the apertures 34 and through which the bits 29 rotatably extend, the lower portions of the chisels being rectangular and provided with lower end cutting edges 40.

The spacer bar 28 spans the space between the yoke members 10 and 10a and, since the yoke members comprise a web 42 and inner and outer laterally projecting ribs 43, the spacer bar is provided with opposite end slots 44 (Figs. 4 and 6) which receive portions of the webs and the inner ribs 43 are cut away to provide slots 45 (Fig. 1) for receiving the ends of the bar 28 so that the inner ends of the slots 44 straddle and engage the webs 42. The spacer bar 28 is positioned relative to the frame 1, that is the upper yoke members 10, 10a and the lower yoke members 14, 15, by ends of the web 43 at the slots 45 oppositely engaging the ends of the bar 28 on each side of the slots 44.

The bar 28 is slotted on each side of a central cross bar which is provided with an aperture 27, and a pair of bearing blocks 46 are supported by the spacer bar for longitudinal adjustment to maintain the blocks in selected laterally adjusted position in conformity with the adjustment of bearing blocks 32. The blocks 46 are similar to the blocks 32 and each includes a top plate 47 provided at one end with an elongated slot 48 and a block 50 (Figs. 4, 7 and 8) depending from the other end of the plate with an aperture 51 extending through both the plate 47 and block 50. A screw 49 is threaded through each slot 48 and into the body of the spacer bar 28 with the blocks 50 depending into the slots of the bar 28 and with the bit shanks 31 rotatably journalled in the respective apertures 51.

The upper end of each bit shank 31 is provided with a removable conical bearing member 52 that cooperates with a roller bearing assembly 53 (Fig. 19) which is suitably secured within a block 54. The block 54 is laterally adjustably supported on the respective yoke members 10, 10a, as by means of a screw 55 extending through an elongated slot 56 in the block and threaded into the body of the yoke member. The block 54, as best shown in Figs. 16, 17 and 18 is provided with an upper guide channel 57 for receiving an inner yoke rib 43 and the bearing assembly 53 is disposed within a second and lower channel 58. The bearing members 52 are retained in bearing relation with the roller bearing assemblies 53 by the helical gears 61, which are removably secured on the bit shanks 31, bearing on the plates 47 of the bearing blocks 46.

The bit and chisel arrangement illustrated in Fig. 1 will provide the double slotted keyhole K shown in Fig. 9. Should it be desired to provide a keyhole of the double slotted type of different sizes, correspondingly different size bits 26, 29 and chisels 30 will be employed and, of course, the variation of the spacing between the shanks 31 and shaft 25 will require different size gears 60 and 61. Such displacement of the axes of bit shanks 31 relative to the axis of bit shaft 25 is readily accomplished by means of the laterally adjustable bearing members 32, 46 and 53.

To enable adjustment of the axes of bit shanks 31 with accuracy the blocks 32 may be provided with downwardly directed pointers 65 (Fig. 1) whose lower ends are disposed adjacent scale plates 66 suitably secured to lower yoke members 14 and 15, and similar pointers 67 may be provided on the bearing blocks 46 and scale plates 68 may be provided on the spacing bar 28 for cooperation with the pointers 67. Since the blocks 32 are disposed relatively close to the plate-like end members 14a, 15a, these end members together with the lower ends of yoke members 10, 10a are provided with slots 69 (Fig. 12) to provide sufficient clearance for outward adjustment of the blocks 32.

The main relatively large bit 26 may be subject to binding within the material being bored and to avoid such action the invention includes a shaving removing member 62 (Figs. 1–2) which is preferably of helical form and is removably secured to the bit shaft 25 in surrounding relation thereto by means of screws 63 which extend through opposite ends of member 62 and into tapped apertures in the bit shaft 25.

To facilitate assembly of the shaft 25 with the frame 1, the shaft 25 preferably is formed in three sections $x$, $y$ and $z$ which are secured in alignment by collar couplings 70 and 71. The upper section $x$ of the shaft 25 is adapted for attachment to the chuck $c$ and is journalled relative to the frame 1 by the hubs 11, 11a. The central section $y$ of the shaft 25 is journalled in the aperture 27 of the spacer bar 28 and is coupled to the upper section $x$ by the collar 70. The lower section $z$ of the shaft 25 is journalled in the aperture 24 of the bearing block 23 carried by the lower yoke member 14 and is coupled to the central or intermediate section $y$ by the collar 71, the bit 26 being carried by the free end of the lower section $z$.

The main drive helical gear 60 is removably fixed on the intermediate shaft section $y$ and may be removed and replaced by releasing the collar 70 from the section $y$ and relatively lifting the upper section $x$ while lowering the central and lower sections $y$ and $z$ to the limit imposed by the lower collar 71 and the lower bearing 23 so that the helical gear 60 may be withdrawn from the section $y$ and removed from between the collar 70, which is limited by the hub 11, and the spacer bar 28. Obviously the collars 70 and 71 may be released from the upper and lower sections $x$ and $z$ if necessary. When the shaft sections are coupled together, the composite shaft 25 is retained relative to the frame 1 by the bearing engagement of the helical gear 60 with the upper side of the spacer bar 28 and by engagement of the lower collar 71 and the under side of the spacer bar 28, a washer 72 preferably being interposed between the collar 71 and bar 28.

As previously stated, the helical gears 61 bear upon the blocks 46 of the spacer bar 28 to support the bit shanks 31 with the conical bearings 52 in relation to the roller bearings 53. Both the conical bearings 52 and the helical gears 61 are removably mounted on and releasably secured to the bit shanks 31 and these elements, and/or the bits may be removed and replaced by releasing the helical gears 61 and bearings from the shanks 31, lowering the bits 29 and their shanks 31, removing the bearing elements 52 to free the ends of the shanks 31, and then removing and/or replacing the bits and/or helical gears and finally replacing the bearings 52, the helical gears 61 being secured to the shanks so as to maintain the conical bearings 52 in engagement with the roller bearings 53.

The hubs 11, 11a are offset relative to each other and to the ends of their respective upper yoke members 10, 10a. This arrangement enables the hubs to be disposed in overlapping association on the shaft 25 but substantially contiguous with the upper and lower sides of the yoke members 10 and 10a. Preferably, a collar 73 is removably fixed on the shaft 25 immediately above the hubs 11, 11a to prevent any possible relative axial displacement therebetween. It will be noted that the hub 11a of the yoke member 10a overlies the hub 11 of the yoke member 10 so that in separating the parts, the hub 11a and yoke member 10a may be first removed from the shaft 25.

In the event that it is desired to provide a single slot keyhole of the character shown in Fig. 10 the yoke members 10a and 15 may be readily removed and therewith one of the bit shanks 31 together with the bearing blocks and gear therefor thereby providing a structure substantially as illustrated in Fig. 22. The removal of yoke member 10a will of course require disconnection of bit shaft 25 from the chuck $c$ to permit removal of the hub 11a. In the conversion of the tool, an auxiliary, U-shaped lower yoke member 64 (Figs. 14, 15 and 22) is substituted for the yoke member 15. The yoke member 64 is subtantially in the form of the yoke member 15 except that it does not include an end member corresponding to the end member 15a. Like the yoke member 15, the auxiliary yoke member 64 is secured by screws 20 and 21 to the yoke member 14 to prevent spreading of the arms 18 (Fig. 11) of the lower main yoke member 14.

The improved tool as above described provides not only for ready alteration for forming different types of keyholes, but also for different size keyholes of either type and the sectional formation of the tool provides for ready repair or replacement of damaged or worn parts.

Although a certain specific embodiment of the invention has been shown and described, it is obvious that many modifications thereof are possible. The invention, therefore, is not to be restricted except insofar as is necessitated by the prior art and by the spirit of the appended claims.

What I claim and desire to secure by U. S. Letters Patent is:

1. A drill press attachment comprising a generally rectangular open frame, a relatively large bit having a shank rotatably supported on a vertical axis centrally of said frame, a combined bit and chisel disposed on at least one side of said shank, cooperating gears on said shank and said last bit for rotation of said last bit upon rotation of said shank, said frame comprising a pair of upper yoke members and a pair of lower yoke members, said upper yoke members including laterally opposed, inverted, generally L-shaped members each including a horizontal branch with a vertical branch depending therefrom, a hub on the free end of each horizontal branch, said hubs being superimposed with said shank removably journaled therein, said lower yoke members being rigidly joined together and removably attached to the depending vertical branches of said upper yoke members, and laterally adjustable bearing means for said last bit and chisel carried by said horizontal branches of said upper yoke members and said lower yoke members respectively.

2. The structure according to claim 1 together with an elongated spiral chip remover removably secured to said shank in surrounding relation thereto and with one end thereof being disposed adjacent said first bit.

3. The structure according to claim 1 wherein said lower yoke members are removably secured to each other.

4. A tool for forming a keyhole comprising a central hole and a pair of diametrically opposed slots opening into a hole, or a keyhole comprising a hole and a single diametrically extending slot opening thereinto comprising a frame section having a hole forming bit rotatably supported therein and a combined slot forming bit and chisel supported thereby, a second frame section removably engaged with said first section and supporting a combined slot forming bit and chisel, vertically spaced and laterally adjustable bearing blocks in said frame sections for said slot forming bits, and drive means between said hole forming bit and said slot forming bits.

5. A tool of the character described, comprising a generally rectangular open frame including a pair of laterally opposed inverted generally L-shaped upper yoke members including horizontal and vertical branches, a pair of horizontally disposed lower yoke members having their opposite ends removably connected to the lower free ends of said vertical branches, a main bit having a vertical shank rotatably journalled in said horizontal branches and in one of said lower yoke members, a combined bit and chisel supported by said one lower yoke member and the horizontal branch of one of said upper yoke members at one side of said shank, a combined bit and chisel supported by the other upper and lower yoke members at the opposite side of said shank, drive means between said shank and said last mentioned bits, and means removably connecting the adjacent ends of said lower yoke members together rigidly, whereby said other lower yoke member and said bit and chisel supported thereby may be removed to enable the use of said main bit and first mentioned bit and chisel for making keyholes.

6. The structure according to claim 5 wherein said upper yoke members are provided with superposed hubs in which said shank is rotatably journalled.

7. The structure according to claim 5, wherein said lower yoke members are provided with laterally adjustable blocks and the upper ends of said chisels are supported by said blocks.

8. The structure according to claim 5, together with a spacing bar disposed between the vertical branches of said upper yoke members, and journals for said last mentioned bits carried by said bar.

9. The structure according to claim 5 comprising headblocks on the horizontal branches of said upper yoke members and including antifriction thrust bearings for the upper ends of said chisel bits.

10. A boring and mortising tool comprising an L-shaped upper yoke member disposed in inverted relation and including a horizontal branch with a vertical branch depending from one end thereof, a journal at the other end of said horizontal branch, a bifurcated horizontally disposed lower yoke member removably secured to the lower end of said vertical branch, a bearing block removably mounted between the bifurcations of said lower yoke member and coaxially disposed with relation to said journal, a shank journalled in said journal and bearing block and including a bit disposed beyond said lower yoke member, a thrust bearing on said horizontal branch, a second bearing block removably mounted between the bifurcations of said lower yoke member in axial alignment with said thrust bearings, a second bit rotatably supported by said thrust bearing and second bearing block in spaced parallel relation to said shank, and a second lower yoke member removably secured to the bifurcations of said first mentioned lower yoke member to prevent spreading of said bifurcations and loosening of said bearing blocks.

References Cited in the file of this patent

UNITED STATES PATENTS

| | | |
|---|---|---|
| 140 | Mace | Mar. 11, 1837 |
| 421,416 | Mickler | Feb. 18, 1890 |
| 421,417 | Mickler | Feb. 18, 1890 |
| 495,050 | Miller | Apr. 11, 1893 |
| 515,237 | Lavigne | Feb. 20, 1894 |
| 516,014 | Hepp | Mar. 6, 1894 |
| 629,294 | Heady | July 18, 1899 |
| 632,764 | Stephens | Sept. 12, 1899 |
| 842,318 | Kinnear | Jan. 29, 1907 |
| 1,574,951 | Wagner | Mar. 2, 1926 |
| 1,778,849 | De Reign | Oct. 21, 1930 |